United States Patent
McPeek

(10) Patent No.: US 7,122,217 B1
(45) Date of Patent: *Oct. 17, 2006

(54) TOMATO-BASED CARAMELIZED SAUCE AND PROCESS FOR MAKING SAME

(76) Inventor: Ruth Ann McPeek, 3153 S. Custer Rd., Monroe, MI (US) 48161

( * ) Notice: Subject to any disclaimer, the term of this patent is extended or adjusted under 35 U.S.C. 154(b) by 588 days.

This patent is subject to a terminal disclaimer.

(21) Appl. No.: 10/413,996

(22) Filed: Apr. 16, 2003

Related U.S. Application Data

(63) Continuation of application No. 09/842,680, filed on Apr. 27, 2001, now Pat. No. 6,576,284.

(51) Int. Cl.
*A23L 1/39* (2006.01)
(52) U.S. Cl. ...................................................... 426/589
(58) Field of Classification Search ................ 426/589, 426/638, 639, 599, 615, 650
See application file for complete search history.

(56) References Cited

U.S. PATENT DOCUMENTS 6,576,284 B1    6/2003   McPeek ...................... 426/589

OTHER PUBLICATIONS

"Complete Guide to Home Canning, Preserving and Freezing," U.S. Dept. of Agriculture. Jan. 1994, Dover Publications, pp. 74, 79, and 82-84.
Street, Myra, "The Encyclopedia of Homemade Preserves." Jan. 1996. Courage Books, Publisher. pp. 63, 80.

*Primary Examiner*—Keith Hendricks
(74) *Attorney, Agent, or Firm*—Greenblum & Bernstein, P.L.C.

(57) ABSTRACT

A tomato-based sauce and a process for making such sauce. The sauce of the invention is primarily intended as a pasta sauce, which has a unique texture and taste. The preparation of the sauce includes the inclusion of a substantial quantity of sugar. The components of the sauce are cooked at a low temperature for approximately two hours to caramelize the sugar, producing a uniquely textured and flavored character.

16 Claims, No Drawings

TOMATO-BASED CARAMELIZED SAUCE AND PROCESS FOR MAKING SAME

CROSS-REFERENCE TO RELATED APPLICATION

This application is a continuation of U.S. patent application Ser. No. 09/842,680, filed on Apr. 27, 2001, now U.S. Pat. No. 6,576,284, the disclosure of which is hereby incorporated by reference thereto in its entirety and the priority of which is hereby claimed under 35 U.S.C. §120.

BACKGROUND OF THE INVENTION

1. Field of the Invention

The present invention relates generally to a tomato-based sauce and a process for making such sauce. More particularly, the invention is related to a sauce which includes a caramelization of a substantial amount of sugar, the sugar being an additive to the sauce, as well as a caramelization of sugars which are additional components of the sauce.

2. Description of Background and Relevant Information

Tomato-based sauces, particularly sauces for spaghetti and other sauces, are popular items in the diets of many people and many families. Conventionally, the modern consumer utilizes ready-made products of one of the major food-product companies when preparing the evening meal of spaghetti and spaghetti sauce. The sauce is emptied into a sauce pan, heated, and then served with the cooked spaghetti.

What the ready-made products offer in terms of convenience they typically lack in flavor. It is known that the processing necessary for providing an adequate shelf-life for such sauces, such as treatment at high temperatures, serve to degrade their flavor, texture, and color, for example.

Attempts to improve the appeal of such ready-made products have led to the development of lines of pasta sauces within brands. Such lines include names as such "roasted garlic," "roasted peppers and garlic," "sun-dried tomato," "marinara and burgundy wine," and even "Florentine spinach and cheese."

Home-made pasta sauces can require somewhat more time for a typical consumer to make and they can be somewhat more flavorful than the ready-made type, particularly when fresh ingredients are used. Nevertheless, there remains a need for a pasta sauce that is flavorful and is different from pasta sauces that are presently known.

It is known that known pasta sauces include a variety of different additives, such as different spices, to affect the flavor of the resultant sauce. Known pasta sauces have flavors in which certain constituents dominate, i.e., sauces have flavors dominated by the taste of salt, garlic, oregano, or tomato. In general, however, known pasta sauces have a generally predictable texture and taste.

DESCRIPTION OF THE INVENTION

It is an object of the invention to provide a tomato-based sauce, particularly such a sauce intended for pasta, which has a unique texture and taste.

More particularly, the tomato-based sauce of the invention includes a substantial amount of sugar, which adds a sweet taste and which enables a caramelization during the preparation of the sauce. Whereas a small amount of sugar is known to be added in pasta sauces, it is known to be used for the purpose of balancing the acid content of the tomato. In a typical quantity of sauce to be made for a meal, anywhere from a pinch to a teaspoon or two of sugar is added for this purpose.

In a preferred embodiment of the sauce of the invention, a quantity of meat, such as lean ground beef or turkey, is included.

In that embodiment, which produces about six quarts of sauce and can serve about 20 people, three pounds of lean ground beef or turkey is browned and drained. To the browned meat, a large onion is then chopped and added. Then about 28 ounces of tomato sauce and 12 ounces of tomato paste are added. The components thus far are then mixed well. To that mixture, the following components are added: about two tablespoons of garlic salt, about two tablespoons of crushed garlic, about two tablespoons of oregano, one bay leaf, and about one to one-and-a-half cups of sugar.

It is contemplated that, while maintaining the quantity of about one to one-and-a half cups of sugar, the amount of tomato sauce could vary from about 12 ounces to about 36 ounces and the amount of tomato paste could vary from about 6 ounces to about 18 ounces. Thereby, the total combined amounts of tomato sauce and tomato paste could vary from about 18 ounces to about 54 ounces.

The components are then heated at a low temperature, sometimes referred to as a simmer, for at least about two hours, to caramelize the sugar. The pasta sauce thus prepared has a sweet, garlic taste. The substantial amount of sugar adds a unique character to the sauce. The sauce has a unique flavor and texture by virtue of the sugar, the sugar having been caramelized during the long, slow simmering.

In summary of the foregoing, the invention contemplates the preparation of a tomato-based caramelized sauce which includes a mixture of components. The mixture of components includes a quantity of tomato sauce and/or paste and a quantity of sugar in the proportion of about one to about one-and-a-half cups of sugar to about 18 to about 54 ounces of tomato sauce and/or paste, whereby the sugar becomes caramelized from a heating of the mixture. The heating is done at a simmer for at least about two hours.

I claim:

1. A tomato-based caramelized sauce comprising:
   a mixture of components, said mixture of components comprising a quantity of tomato sauce and/or paste and a quantity of sugar, said sugar having been caramelized from a heating of said mixture;
   said quantity of tomato sauce and/or paste and said quantity of sugar comprising a proportion of about one to about one-and-a-half cups of sugar to about 18 to about 54 ounces of tomato sauce and/or paste.

2. A tomato-based sauce according to claim 1, wherein:
   said proportion comprises about one to about one-and-a-half cups of sugar to about 40 ounces of tomato sauce and/or paste.

3. A tomato-based sauce according to claim 2, wherein:
   said proportion comprises about one to about one-and-a-half cups of sugar to about 28 ounces of tomato sauce and about 12 ounces of tomato paste.

4. A tomato-based sauce according to claim 1, further comprising:
   a quantity of flavorings.

5. A tomato-based sauce according to claim 4, wherein:
   said quantity of flavorings comprises at least one of the following flavorings: onion, garlic salt, crushed garlic, oregano, or bay leaf.

6. A tomato-based sauce according to claim 1, wherein:
for each said portion of sugar to tomato sauce or tomato paste, said tomato-based sauce further comprises a quantity of flavorings, said quantity of flavorings comprising onion, one or more garlic flavorings, oregano, and bay leaf.

7. A tomato-based sauce according to claim 1, wherein:
for each said portion of sugar to tomato sauce or tomato paste, said tomato-based sauce further comprises a quantity of flavorings, said quantity of flavorings comprising at least about three pounds of meat.

8. A process for making a tomato-based caramelized sauce comprising:
combining an amount of tomato sauce and/or tomato paste with an amount of sugar to form a mixture in a proportion of about one to about one-and-a-half cups of sugar to about 18 ounces to about 54 ounces of tomato sauce and/or tomato paste;
simmering said mixture for a time to cause caramelizing of said sugar.

9. A process for making a tomato-based sauce according to claim 8, wherein:
said simmering is performed for at least about two hours.

10. A process for making a tomato-based sauce according to claim 8, wherein:
said proportion comprises about one to about one-and-a-half cups of caramelized sugar to about 40 ounces of tomato sauce and/or paste.

11. A process for making a tomato-based sauce according to claim 9, wherein:
said proportion comprises about one to about one-and-a-half cups of caramelized sugar to about 28 ounces of tomato sauce and about 12 ounces of tomato paste.

12. A process for making a tomato-based sauce according to claim 8, wherein:
for each said portion of caramelized sugar to tomato sauce or tomato paste, said process comprises adding a quantity of chopped onion to said mixture.

13. A process for making a tomato-based sauce according to claim 12, wherein:
for each said portion of caramelized sugar to tomato sauce or tomato paste, said process further comprises adding about three pounds of ground beef or turkey to said mixture.

14. A process for making a tomato-based sauce according to claim 8, further comprising:
adding a quantity of flavorings to said mixture.

15. A process for making a tomato-based sauce according to claim 14, wherein:
said quantity of flavorings comprises at least one of the following flavorings: an onion, garlic salt, crushed garlic, oregano, or bay leaf.

16. A process for making a tomato-based sauce according to claim 14, wherein:
for each said portion of caramelized sugar to tomato sauce or tomato paste, said quantity of flavorings added to said mixture comprises an onion, about two tablespoons of garlic salt, about two tablespoons of crushed garlic, about two tablespoons of oregano, and one bay leaf.

* * * * *